United States Patent
Ngwe et al.

(10) Patent No.: US 8,780,679 B2
(45) Date of Patent: Jul. 15, 2014

(54) PARTIAL-BLOCK OFF-TRACK DATA RECOVERY

(75) Inventors: Myint Maung Ngwe, Singapore (SG); Hong Li Sun, Singapore (SG); Hiau Choon Kee, Singapore (SG); Quek Leong Choo, Singapore (SG); Kian Wai Ng, Singapore (SG); Zhi Ye, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 1640 days.

(21) Appl. No.: 11/831,490

(22) Filed: Jul. 31, 2007

(65) Prior Publication Data

US 2009/0034380 A1 Feb. 5, 2009

(51) Int. Cl.
*G11B 7/085* (2006.01)
*G11B 20/12* (2006.01)

(52) U.S. Cl.
CPC .... *G11B 20/1217* (2013.01); *G11B 2020/1284* (2013.01)

USPC ............................................ 369/30.03

(58) Field of Classification Search
None
See application file for complete search history.

(56) References Cited

U.S. PATENT DOCUMENTS

| | | | | |
|---|---|---|---|---|
| 6,079,044 | A * | 6/2000 | Cunningham et al. | 714/763 |
| 6,266,202 | B1 * | 7/2001 | Nguyen et al. | 360/53 |
| 6,557,113 | B1 * | 4/2003 | Wallentine et al. | 714/5 |
| 7,023,645 | B1 * | 4/2006 | Emo et al. | 360/75 |
| 2003/0198153 | A1 * | 10/2003 | Van Den Enden | 369/47.4 |

* cited by examiner

*Primary Examiner* — Adam R Giesy
*Assistant Examiner* — Henok Heyi
(74) *Attorney, Agent, or Firm* — Hollingsworth Davis, LLC (57) ABSTRACT

Techniques for data recovery from a data block wherein portions of the data block are written at different off-track positions are described. For example, portions of a data block can be read separately for each on-track and off-track position in the data block; then, the separately read portions can be recombined into a recovered data block.

17 Claims, 11 Drawing Sheets

| Stage of split-block offtrack write | Number of read operations required |
|---|---|
| Detection | 17 |
| Recovery | Equal to the number of data splits |

FIG. 11

| Does the data block have at least two portions written at different off-track positions? | Number of extra read operations required |
|---|---|
| No | 0 |
| Yes | 2 to 3 for 1K byte sector |
| | 7 or 8 for 4K byte sector |

PARTIAL-BLOCK OFF-TRACK DATA RECOVERY

BACKGROUND

Data storage media commonly used for storage and retrieval of data comes in many forms, such as magnetic tape, magnetic disks, optical tape, optical disks, holographic disks or cards, solid state memory such as flash memory and the like. In magnetic media, data is typically stored as magnetization patterns that are magnetically recorded on the medium surface. The data stored on the medium is typically organized along "data tracks," and transducer heads are positioned relative to the data tracks to read or write data on the tracks.

Servo patterns refer to patterns or other recorded marks on the medium that are used for tracking purposes. In other words, servo patterns are recorded on the medium to provide reference points to locate the data tracks. A transducer head detects a servo pattern and sends a signal representing the detected pattern to a servo controller. The servo controller interprets a detected servo pattern and generates a position error signal (PES). The PES is used to adjust the radial distance of the transducer head so that the transducer head is properly positioned to a data track for effective reading and/or writing of data to the data track.

Disc drives store data on one or more surfaces of one or more rotatable magnetic discs in data tracks in concentric circles or, alternatively, in spiral patterns. The data tracks are generally divided into a plurality of data blocks. Data blocks of a disc drive may also be referred to as sectors. In disc drives, servo patterns are generally recorded in specialized areas on the disc surfaces in amongst the data tracks, called "servo wedges." Servo wedges serve as references for the servo controller. Some magnetic media include a plurality of servo wedges, with data tracks being located in data wedges between the servo wedges.

Even though disc drives include servo patterns to properly locate a transducer head during a write operation, data may be inaccurately located adjacent to the center of a data track. This is referred to herein as off-track write. Off-track write may occur due to vibration or servo error. One technique for recovering data recorded as off-track write is to perform off-track retry in the readback process. When off-track write is suspected at a data block, an off-track retry technique tries to off-track read the whole data block at various off-track positions. While more tedious than reading data that is accurately positioned in a data track, an off-track retry technique allows recovery of data that can not be read by looking only at the center of a data track.

SUMMARY

Techniques for data recovery from a data block wherein portions of the data block are written at different off-track positions are described. For example, portions of a data block can be read separately for each on-track and off-track position in the data block; then, the separately read portions can be recombined into a recovered data block.

In one embodiment, a method comprises determining that a recorded data block includes at least two portions written at different track positions including at least one portion written at an off-track position, reading each portion at position corresponding to the off-track positions of the at least two portions, and combining the portions of the data block to form a recovered data block.

In another embodiment, a device comprises a data storage media including data recorded in one or more data blocks, and a controller that determines one of the data blocks includes at least two portions written at different track positions including at least one portion written at an off-track position and also determines approximate track positions of the at least two portions of the data block.

In another embodiment, a controller is configured to determine that a data block including recorded data on a data storage media includes at least two portions written at different track positions including at least one portion written at an off-track position, determine approximate track positions of the at least two portions of the data block, and issue instructions to read the at least two portions of the data block at the approximate track positions.

These and various other features and advantages will be apparent from a reading of the following detailed description.

DETAILED DESCRIPTION

Figure 1:
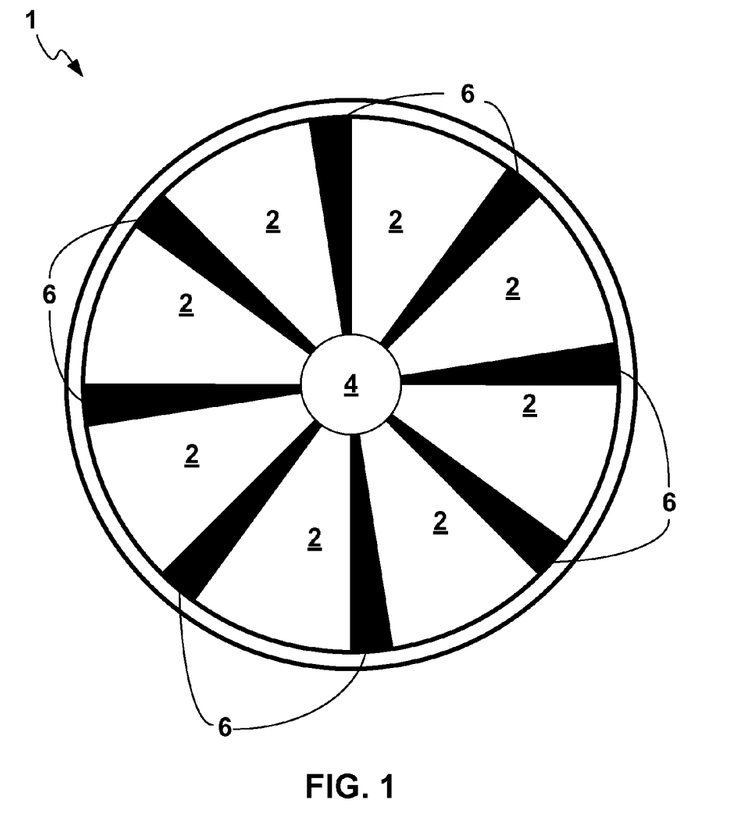
FIG. 1 illustrates a data storage disc including servo wedges and data wedges.
Figure 2:
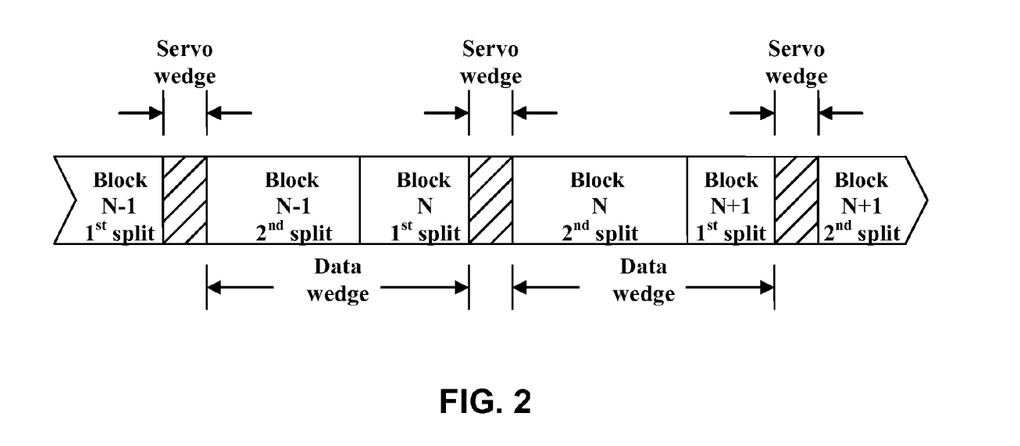
FIG. 2 illustrates a data block having multiple splits across several data wedges.

FIG. 1 illustrates data storage disc 1. Data storage disc 1 is a component of a disc drive. Data storage disc 1 rotates about a spindle at center portion 4. Data storage disc 1 includes data wedges 2 and servo wedges 6. Data wedges 2 hold a plurality of data tracks in a spiral or concentric configuration. Each data track is divided among each data wedges 2. The data tracks are include multiple data blocks. At least some of the data blocks are divided within a single data track among more than one of data wedges 2.

If off-track write occurs when writing data to data storage disc 1, only part of a data block may be written off-track while the rest of it is written on-track correctly. For example, in a data block divided among two or more of data wedges 2, when off-track write starts after a first servo wedge 6, off-track write would end with the arriving of the next servo wedge 6, which provides the information necessary to properly position the transuding head at the center of a data track. In such a circumstance, only the portion of the data block residing after the first servo wedge 6 and prior to the next servo wedge 6 would be affected. This is referred to herein as partial-block off-track data.

A data block with partial-block off-track data may cause an unrecoverable data error if no radial tracking position allows reading of data from each portion of the data block. An off-track retry technique is not effective to recover partial-block off-track data as it produces errors on the good parts of the data block while off-track reading the bad parts the data block. Conversely, on-track reading produces errors on the bad part of the data block while reading the good parts the data block.

A data block with partial-block off-track data is a more severe and common problem in disc drives having data blocks divided among more data wedges. For this reason, disc drives using larger data blocks may experience data blocks having partial-block off-track data more commonly than disc drives using smaller data blocks. As examples, in a disc drive using one kilobyte (kB) data blocks, data blocks may be split across 2 or 3 servo wedges. In a disc drive using four kB data blocks, data blocks may be split across 7 or 8 servo wedges. The portions of a data block separated by data wedges are referred to herein as splits.

In order to recover data blocks with partial-block off-track data, a retry based partial-block off-track recovery technique may be utilized. As will be described in further detail through out this document, a retry based partial-block off-track recovery technique looks at portions of a data block having multiple splits across several data wedges separately to read data from each of the splits and then recombines the recovered splits to produce the entire data block.

A retry based partial-block off-track recovery technique may improve a disc drive's reliability, e.g., by reducing the drive susceptibility to a shock event during a write operation. This may be especially useful in disc drive utilized in mobile consumer electronics, such as digital cameras, cellular phones, personal digital assistants (PDAs), handheld global positioning systems (GPS) and the like, where more servo error and vibrations or other shock events are expected.

The number of data blocks versus the number of data wedges for tracks at different radii of a recordable disc varies. The physical size of a data block is not equal to the physical size of a data wedge at most radii. While there are the same number of data wedges for each radius, the number the number of data blocks per track is varies at different radii. Generally, data blocks located near the center of a disc will be spit up among more data wedges that data blocks located at an outer radius of a disc.

When off-track write happens, only part of the data block may affected. I.e., separate portions of a single data block can be misaligned relative to one another. For example, only the portion of a data block that is located in a single data wedge may be written off-track. Depending on the severity of the misalignment, off-track reading the whole data block may not be effective.

Figure 3:
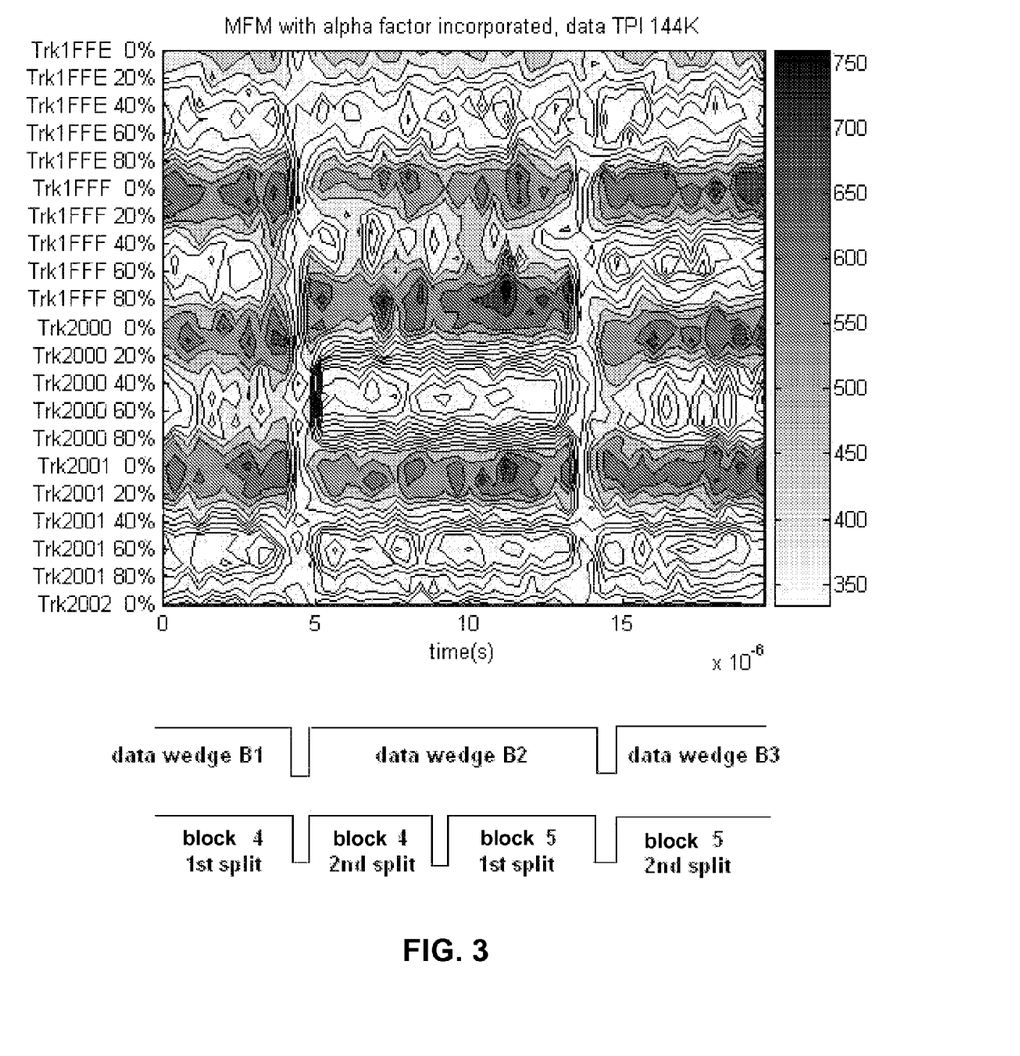
FIG. 3 illustrates a virtual Magnetic Force Microscopy (MFM) plot of a magnetic disc showing partial-block off-track data.

FIG. 3 illustrates a virtual Magnetic Force Microscopy (MFM) plot of a magnetic disc showing a data block with partial-block off-track data. FIG. 3 is a 3-D plot with the x-axis representing the direction of a data track and the y-axis representing a radial direction across tracks. The different shades of gray represent the signal amplitude at a particular medium location. A darker color represents a larger signal amplitude than a lighter color.

As shown in FIG. 3, the data wedge B2 of track 2000 has largest signal amplitude if reading 20% off-track towards track 1FFF. Data wedge B2 of track 2000 contains the second split of block 4 and first split of block 5. Therefore, there is partial-block off-track data for both block 4 and block 5 of track 2000.

Figure 4A:
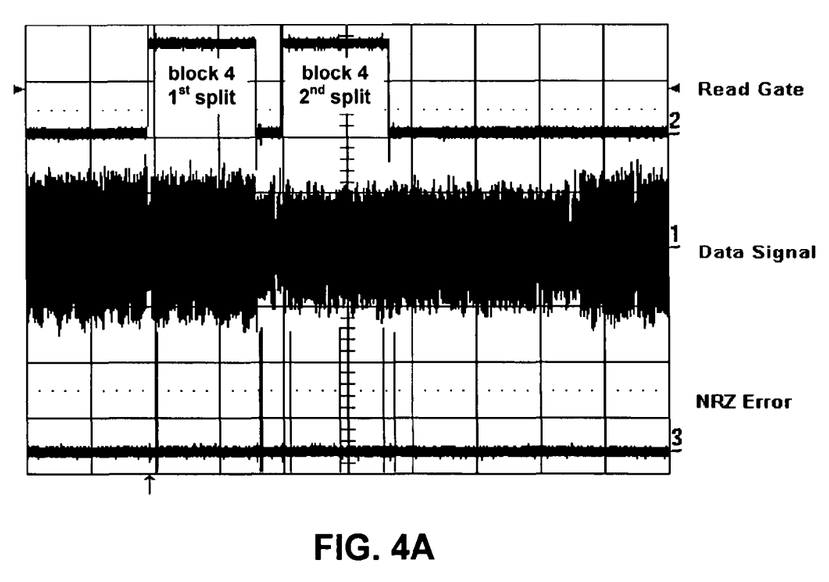
FIGS. 4A-4B illustrate a waveform captured when reading on-track and a waveform captured when reading 20% off-track respectively of the magnetic disc plotted in FIG. 3.
Figure 4B:
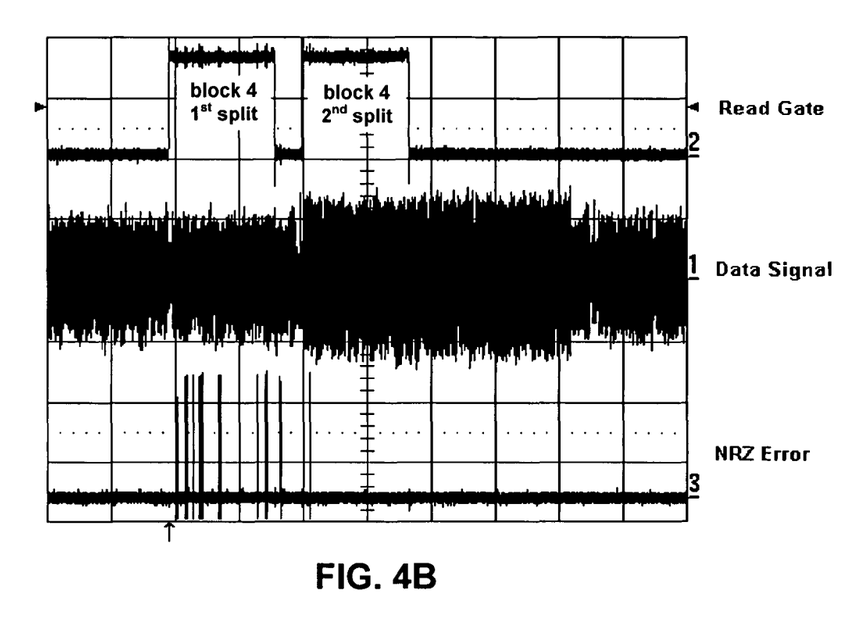

FIGS. 4A-4B illustrate a waveform captured when reading on-track and a waveform captured when reading 20% off-track respectively of the magnetic disc plotted in FIG. 3. More specifically, FIG. 4A is the waveform captured at block 4 of track 2000 when reading on-track. From FIG. 4A, there is amplitude dip at the second split of block 4 when reading on-track. The amplitude dip causes non-return-to-zero (NRZ) errors as shown in FIG. 4A.

FIG. 4B is the waveform captured at block 4 of track 2000 when reading 20% off-track towards track 1FFF. From FIG. 4B, amplitude of second split of block 4 recovers when reading 20% off-track. There is also no NRZ error caused by second split of block 4. However, as shown in FIG. 4B, the amplitude of first split of block 4 becomes smaller due to off-track read, and the amplitude drop at first split of block 4 causes NRZ errors. FIGS. 4A-4B demonstrate that a data block with partial-block off-track data can not be recovered with either on-track read or off-track read.

As discussed with respect to FIGS. 6-15, an intelligent retry technique may be used to detect and recover a data block with partial-block off-track data. In the first step, the existence of the least two portions written at different off-track positions is detected based on channel quality information collected for each data split at various off-track positions. In the second step, the estimated NRZ bits of each data split at different off-track positions are combined to form a new set of NRZ bits. The new set of NRZ bits is then passed to controller for (ECC) decoding to recover the original user data.

To recover a data block with partial-block off-track data, detection of the existence of partial-block off-track data is required. Additionally, recovery also requires knowing which portion(s) of the block have off-track write and how far from the center of a data track the off-track write is.

One technique for detection of partial-block off-track data and for determining how far from the center of a data track the off-track write is involves using channel quality metric. Channel quality metric is a measure of quality of readback signal provided by a read channel chip. Evaluating the channel quality metric for each portion of a data block when reading the data block at various off-track positions provides off-track profiles for each part of the block based on channel quality metric. An off-track profile represents the position of the data relative to the center of a data track. Comparing the off-track profiles for each portion in a data block, we are then able to know whether there are partial-block off-track data and the locations of those portions. For example, the portions may coincide with data splits of the data block that are physically separated by servo wedges. The details of channel quality metric and how to get off-track profiles are discussed below.

Channel quality metric may be acquired at the middle stage of read channel detector to provide a fast yet reliable measure of signal quality. Based on different read channel architectures, there are various channel quality metrics. One example is Quality Metric Count (QMC) provided by Agere Copper Head ULP read channel chip as the channel quality metric to demonstrate the performance of the proposed technique. However, the proposed technique is not limited to QMC.

Figure 5:
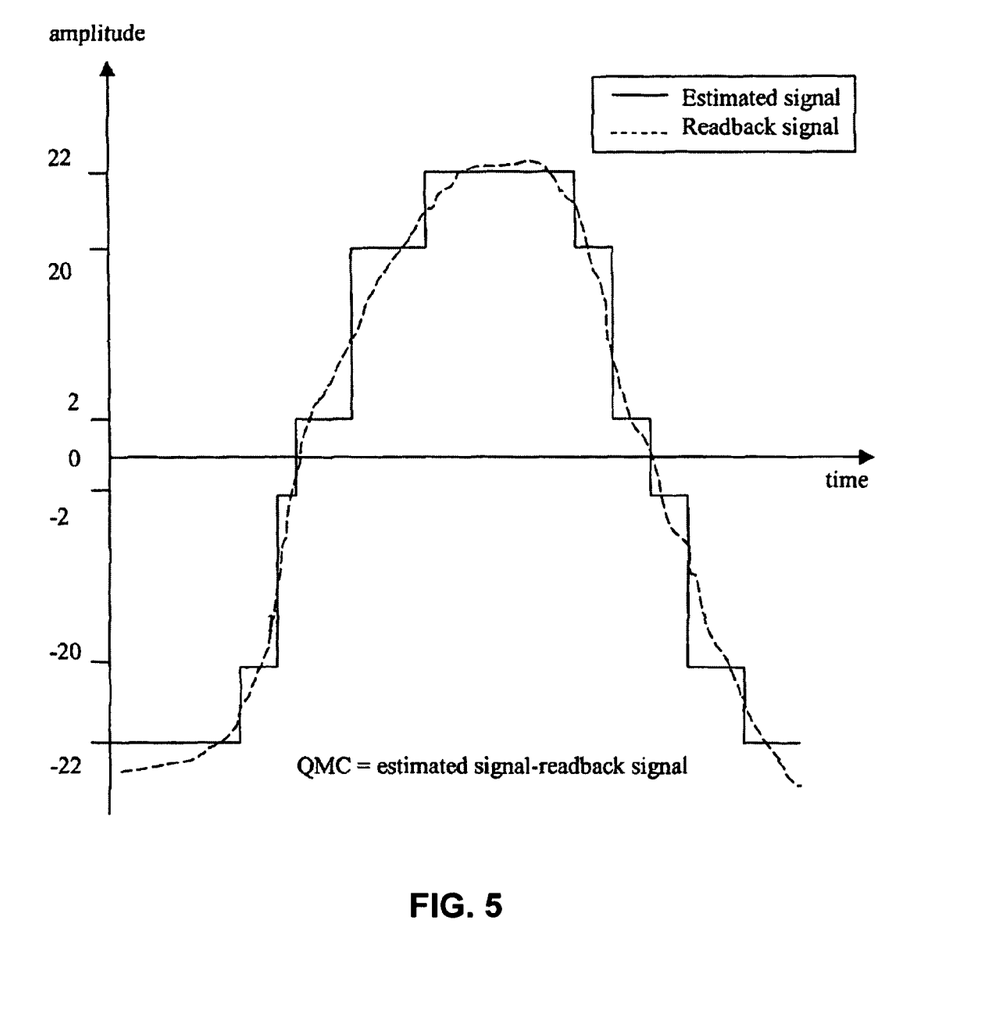
FIG. 5 is a graph comparing an estimated signal with an actual readback data signal as read by a transducer in a disc drive.

QMC is obtained at the output of digital finite impulse response (FIR) filter. S2 1-inch drive uses perpendicular response (PR) target (1, 10, 11). At the output of FIR filter, the amplitude of ideal signal sample has seven values: 0, ±2, ±20 and ±22. The actual signal sample is quantized based on these levels to get the estimated signal sample, as shown in FIG. 5. The channel quality metric is calculated as the difference between the readback signal sample and estimated signal sample. An underlying concept is that the smaller the difference between readback signal sample and estimated signal sample, the better the signal quality should be. Therefore, QMC provides a measure of signal quality.

QMC is accumulative and the value is stored in a register named "QMCNT". This register can be accessed by a controller during normal drive operation. The QMCNT register may be reset when it is read to provide a convenient way to determine channel quality metric for each data split separately. For example, the value of "QMCNT" may be read during every servo wedge, between data splits and also at the end of a data block.

Figure 6:
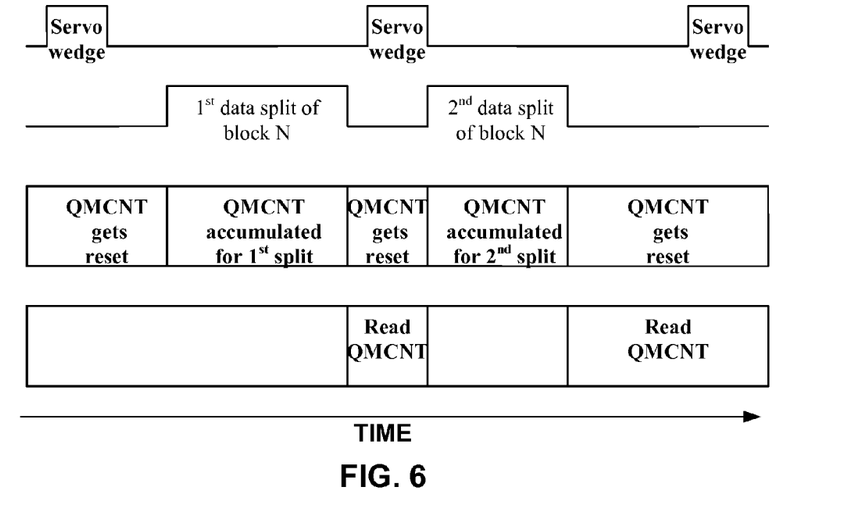
FIG. 6 is a timing diagram demonstrating a technique for acquiring a channel quality metric for each data split in a data block having multiple splits across several data wedges.

FIG. 6 shows a timing diagram of getting channel quality metrics for each data split. The off-track profile for each individual data split can be obtained by getting the QMC for each data split at various off-track positions. Optionally, to limit the effect of electronics noise and other disturbances, a data block may be read multiple times at each off-track position and the value of "QMCNT" obtained during each read can be summed together. For example, a data block may be read two times, three times, four times, five times or even more than five times at each off-track position. The off-track profiles provide which data split(s) have off-track write and how much the off-track write is.

Figure 7:
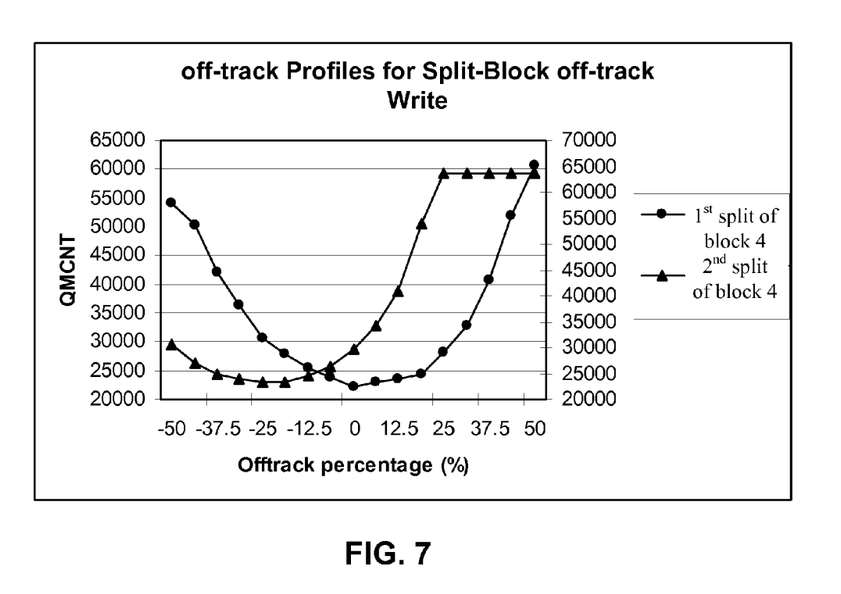
FIG. 7 illustrates off-track profiles for a data block having partial-block off-track data.

FIG. 7 shows the off-track profiles obtained for the readback waveforms captured in FIGS. 4A-4B. As shown in FIG. 7, the first data split is on track while the second data split is located 20% off-track.

Figure 8:
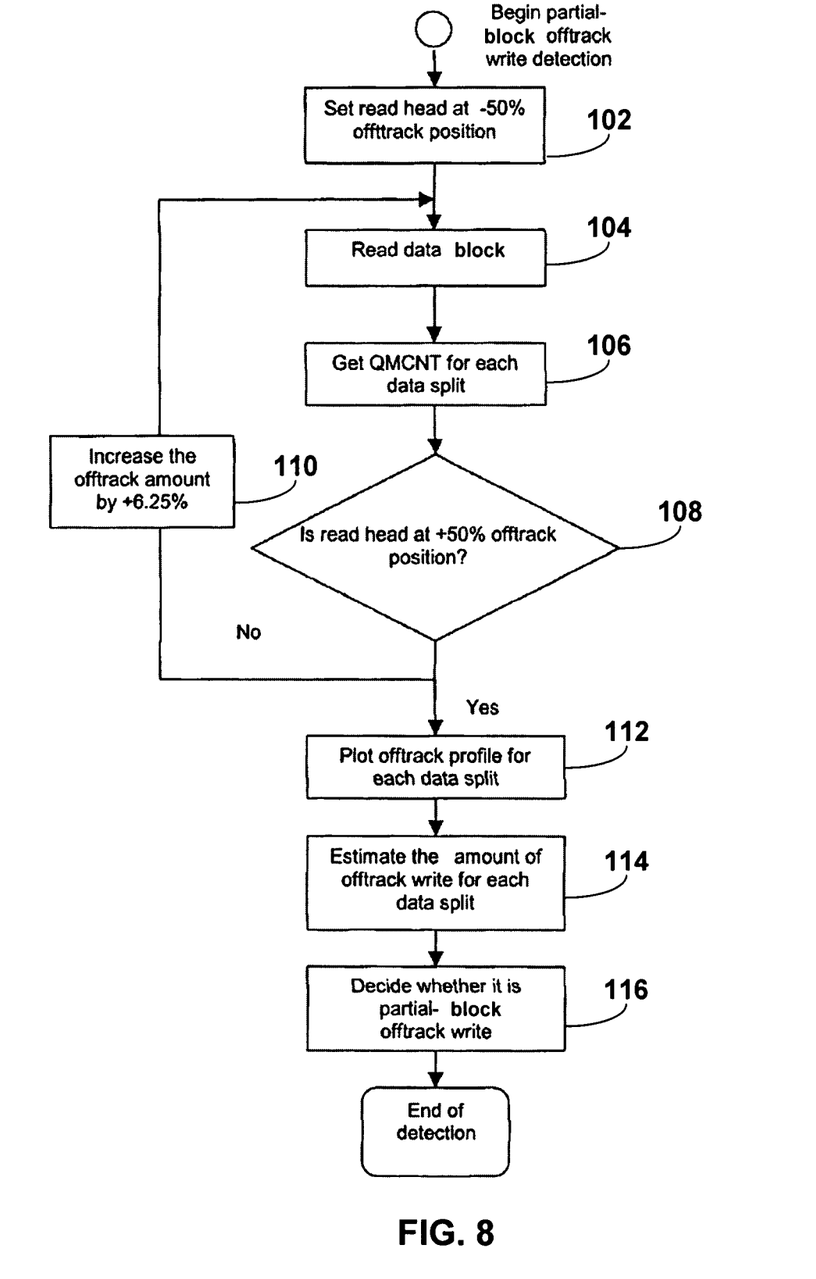
FIG. 8 is a flowchart illustrating a technique for detecting partial-block off-track data.

FIG. 8 is a flowchart illustrating a technique for determining at least two portions pf a data block are written at different off-track positions. First, a read head is positioned at −50% off-track position, i.e., in the middle of the data track being read and an adjacent data track (102). Next, the data block is read (104) and a separate QMCNT is acquired for each data split (106). Steps 104 and 106 are repeated after increasing the off-track amount by ±6.25% (110) up to an including when the read head is at a +50% off-track position (108).

Next, the off-track profiles are evaluated to determine if the data block has partial-block off-track data. The off-track profile is plotted for each data spit of the data block (112). The off-track profile plots are used to estimate the amount of off-track write for each data split (114). For example, step 114 may comprise selecting the off-track amount providing the best QMCNT for the split among the off-track readings taken in step 106. As another example, step 114 may comprise estimating the off-track amount providing the best QMCNT for the split using the off-track readings taken in step 106. Such an estimate may be between the settings of the readings taken in step 106. Then the off-track amount estimates for each split in the data block are compared to determine if the data block has partial-block off-track data (116).

After determining the presence and locations of the portions written at different off-track positions, recovery of the data block can occur. Portions of a data block written at different off-track positions can not all be read at the same time. The smallest unit in a disc drive read/write operation is a data block. In other words, disc drives communicate in units of data blocks, and partial data blocks can not be output to a host device including the disc drive. Such devices may include consumer electronics, personal computers, servers and the like. For this reason, a buffer may be used to store potions of a data block located at different track positions prior to combining the portions into a recovered data block that is then provided to a host device.

Figure 9:
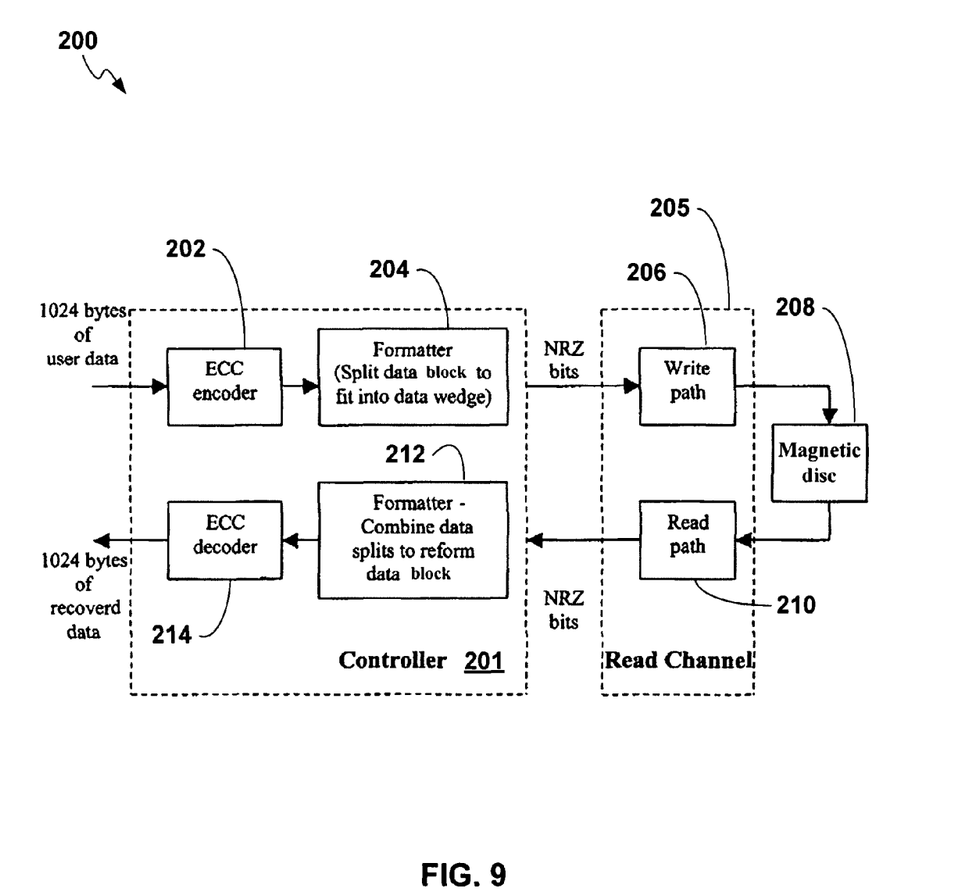
FIG. 9 is a block diagram illustrating a read/write cycle for data stored in a disc drive.

FIG. 9 is a block diagram illustrating a read/write cycle for data stored in disc drive 200. Drive 200 provides partial-block off-track data recovery. As shown in FIG. 9, disc drive 200 includes controller 201, read channel 205 and magnetic disc 208. Disc drive 200 receives and outputs user data in one kB increments. These increments correspond to data blocks physically located on magnetic disc 208. Other disc drives may receive and output user data in differently size increments, such as four kB increments.

Incoming data is received by controller 201. Controller 201 may be, e.g., a firmware controller. The data is encoded by ECC encoder 202 and formatted to the physical splits of the data block by formatter 204. NRZ bits are transferred to magnetic disc 208 via read channel 205 on write path 206.

Data is retrieved in data block increments from magnetic disc 208 via read channel 205 on read path 210. NRZ bits are transferred to formatter 212 in controller 201. In case of a retrieved data block with portions written at different off-track positions, portions including accurately retrieved data are stored by formatter 212 for every each position. Portions that have data written at a different position are disregarded.

For example, assume a data block has two splits and the second split is located 20% off-track. First the whole data block is read on-track and the NRZ bits belonging to first split are stored in a controller memory buffer for formatter 212. Then the whole data block is off-track read by 20% the NRZ bits belonging to second split are stored in controller memory for formatter 212. Formatter 212 then combines the NRZ bits together to form a complete set of NRZ bits for the whole data block. This newly formed set of NRZ bits is passed to ECC decoder 214 for ECC decoding. Controller 201 then outputs the recovered user data.

Figure 10:
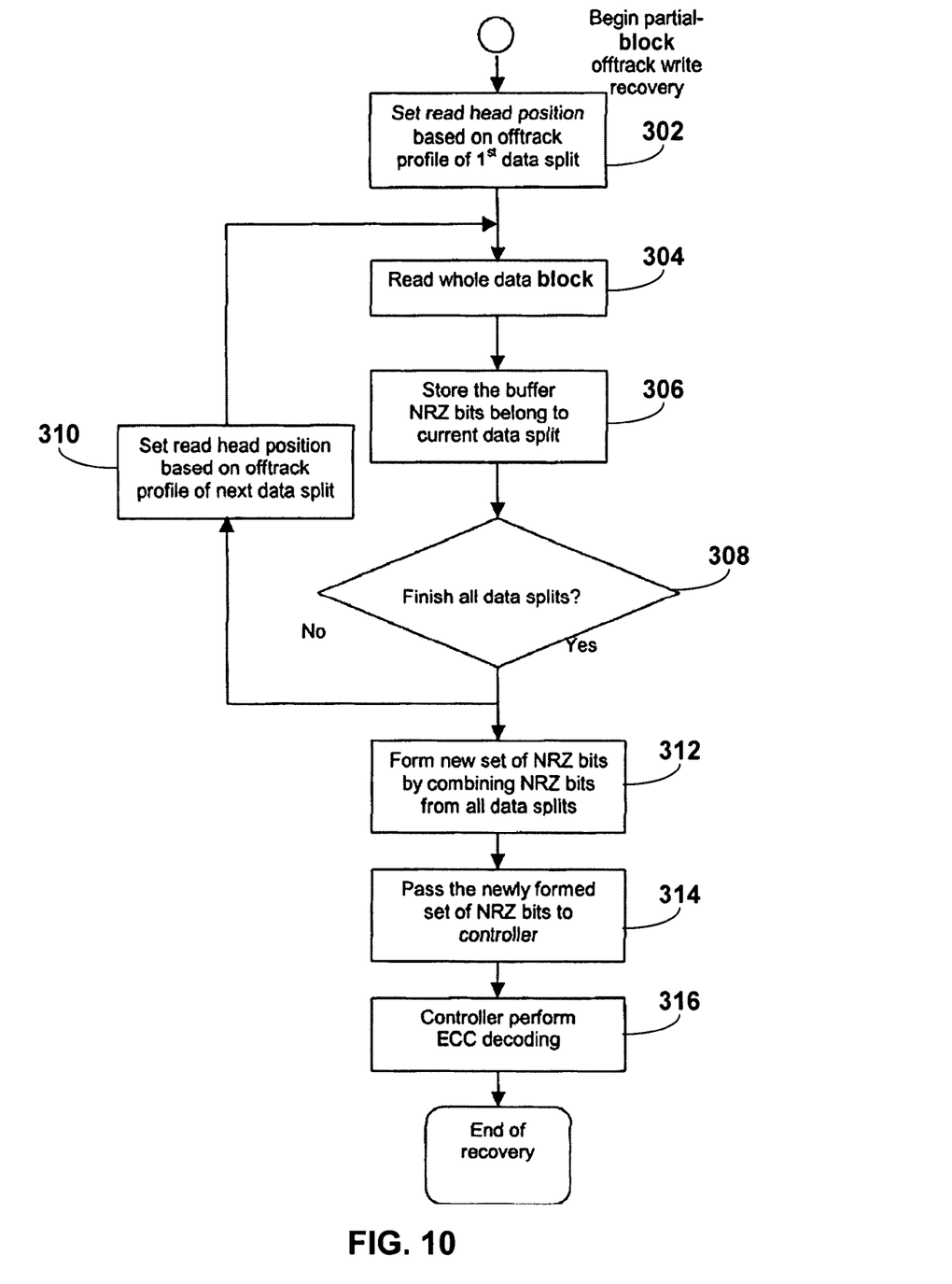
FIG. 10 is a flowchart illustrating a standalone technique for recovering data recorded a data block having partial-block off-track data.

FIG. 10 is a flowchart illustrating a standalone technique for recovering data recorded a data block having partial-block off-track data.

First, the read head position is set based on the off-track profile of the first data split (302). For example, techniques for determining off-track profiles were discussed with respect to FIGS. 6-9. Next, the entire data block is read at the position set in step 302 (304). Then the NRZ bits for the first data split are stored in a buffer (306). Optionally, NRZ bits for every split in the data block having the same track position is also stored in the buffer so that recovery of these splits will not require the data block to be reread. Next, the read head position is set based on the off-track profile of the next unread data split (310). Steps 304, 306 and 310 are repeated unit all of the data splits have been read (308).

After all of the data splits have been read, the data splits are recombined to form an entire data block worth of NRZ bits (312). The NRZ bits are then passed to the disc drive controller (314). The disc drive controller performs ECC decoding (316), and the partial-block off-track data block has been recovered.

Figure 11:
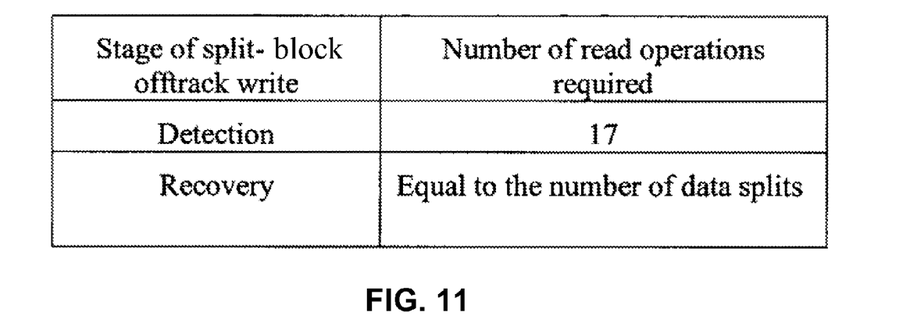
FIG. 11 is a table illustrating a number of read operations required by the standalone technique of FIG. 10.

FIG. 11 is a table illustrating a number of read operations required by the standalone technique of FIG. 10. Using detection stage requires seventeen read operations to read the data block at −50% off-track to +50% off-track with 6.25% increments. The recovery stage requires one read operations for each data split having a different track position. In disc drives that commonly divide a data block among only a few data wedges, most of the time taken by the proposed technique occurs during detection stage.

Figure 12:
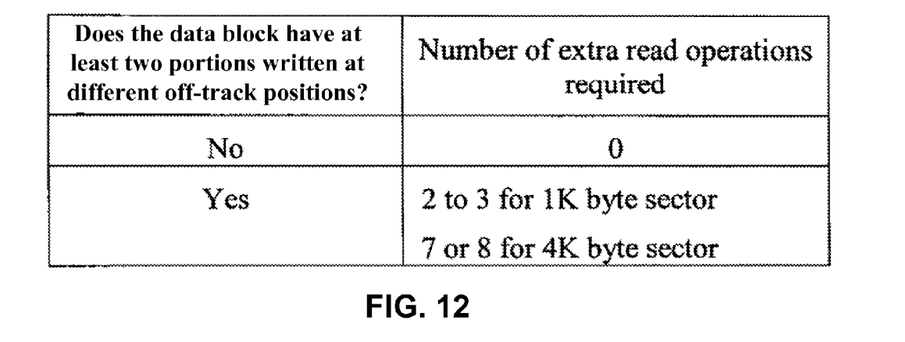
FIG. 12 is a table illustrating an exemplary number of extra read operations required by the technique of FIG. 10 when integrated as part of read retry algorithm.

FIG. 12 is a table illustrating an exemplary number of extra read operations required by the technique of FIG. 10 when integrated as part of read retry algorithm. As shown by FIG. 12, the off-track profiles for each split in the block can be determined during a simple off-track recovery process. As with FIG. 11, the recovery stage requires one read operation for each data split having a different track position—at most, one read operation for each of the data splits.

As shown by FIG. 12, combining partial-block off-track detection with a retry algorithm limits the number of read operations required. To reduce the time taken by the proposed technique, the detection partial-block off-track data is integrated into an off-track retry technique. Off-track retry will is used to deal with full-block off-track write. QMC for various off-track positions are collected when an off-track retry technique performs read operations. If full-block off-tack write is present, off-track retry technique will recover the data and partial-block off-track data recovery is not necessary. If a data block includes portions written at different off-track positions, off-track retry will fail to recover a data block. Once off-track retry finished, the off-track profiles for each split of the failed block may be used to detect there the partial-block off-track data and recover it using buffer NRZ bits.

Figure 13:
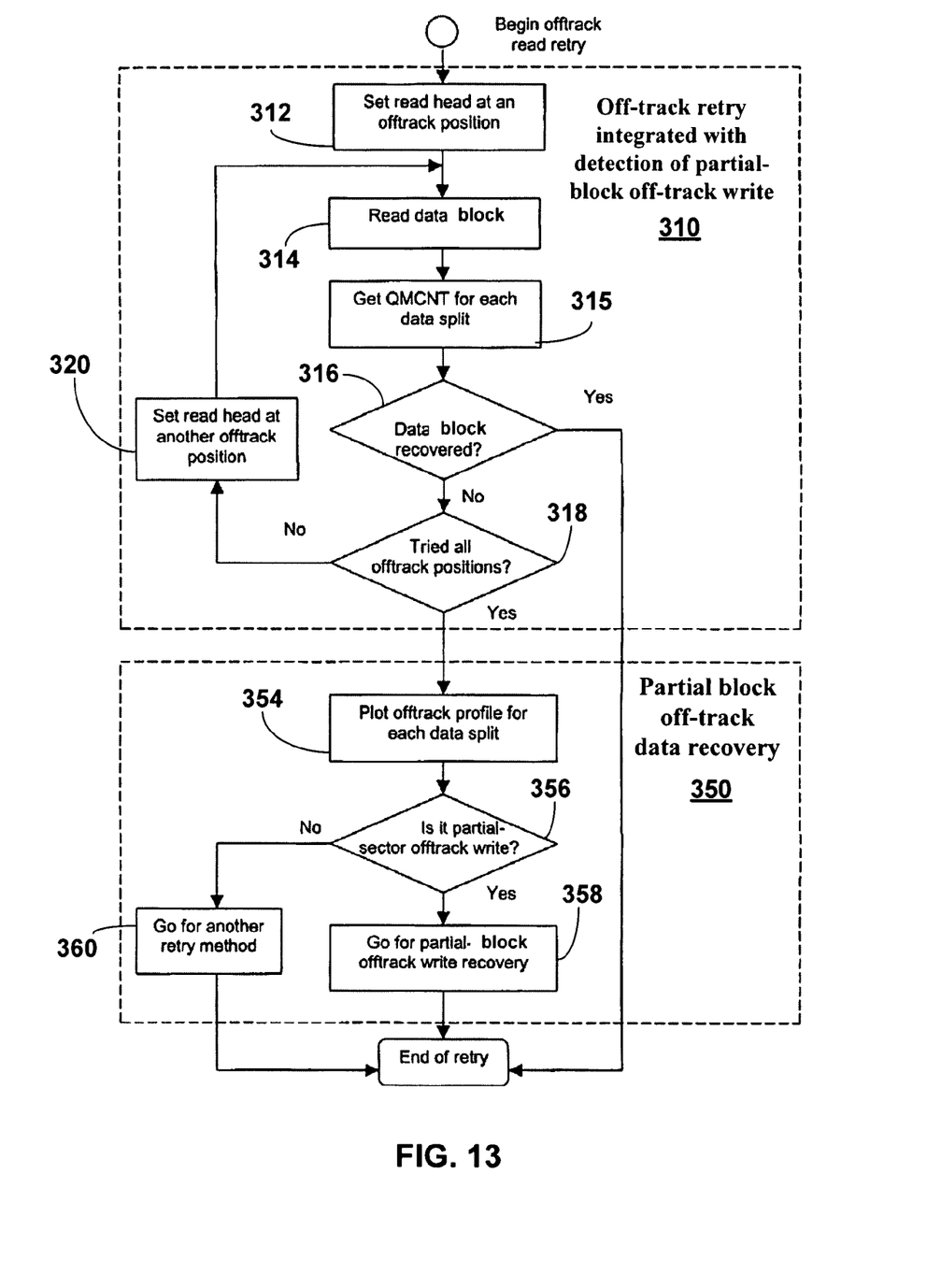
FIG. 13 is a flowchart illustrating an exemplary technique for read retry based partial-block off-track data recovery integrated as part of an off-track read retry algorithm.

FIG. 13 is a flowchart illustrating an exemplary technique for read retry based partial-block off-track recovery integrated as part of an off-track read retry algorithm. The technique includes first performing off-track retry integrated with detection of partial-block off-track data 310 followed by partial-block off-track data recovery 350.

Off-track retry integrated with detection of partial-block off-track data 310 begins by setting a read head in a disc drive at an off-track position, e.g., −50% off-track (312). Next, the entire data block is read (314) and the QMCNT is determined for each data split in the data block (315). As discussed previously, the QMCNT for each data split is used to determine the off-track profile of the data splits in the data block. If the reading of the data block recovered the data, the process is complete as the data has been recovered (316). If not, the read head position is set incrementally to cover a full set of off-track positions (320). Steps 314, 315 and 316 are repeated until each of the incremental off-track positions have been tested for full-block off-track write (318).

If all incremental off-track positions have been tested for full-block off-track write and the data has not been recovered, the technique continues with partial-block off-track data recovery 350. If full-block off-track retry recovered the data, partial-block off-track data recovery 350 is not performed and no time has been used to implement partial-block off-track data recovery 350.

In partial-block off-track data recovery 350, the off-track profile for each data split is evaluated to determine the track position of each data split in the data block (354). The off-track profiles of the data splits are compared to determine the presence of partial-block off-track data (356). If partial-block off-track data exists, partial-block off-track recovery is performed (358). For example, partial-block off-track recovery was discussed with respect to FIGS. 10-13. If partial-block off-track data does not exist, a different recovery technique may be attempted (358).

By integrating the partial-block off-track recovery into a full-block off-track retry technique, the extra time taken for recovery of partial-block off-track data is limited by the number of data splits. For example, for one kB block drives, one to three extra read operations may be required. As another example, for four kB block drives, one to eight extra read operations may be required. If there is no partial-block off-track data in a data block, this is determined during full-block off-track retry and no time is wasted attempting to recover multiple portions written at different off-track positions.

The described techniques have been tested on drives which failed a reliability test due to a data block having portions written at different off-track positions. This test procedure is summarized as follows:

(1) Find the drive which is failed due to a data block having portions written at different off-track positions from virtual MFM plot.
(2) Capture readback signal waveform for the failed data block at various off-track positions.
(3) Store captured waveforms into Arbitrary Waveform Generator (AWG).
(4) Edit captured waveforms by inserting read gate at the position of first data split.
(5) Connect AWG to SESAME channel evaluation board.
(6) Read the captured waveforms at various off-track positions and get the value of channel quality metric QMCNT. This is the off-track profile for first data split.
(7) Repeat step (4)-(6) for every data split.
(8) Based on off-track profiles, determine the amount of off-track write for each data split.
(9) Find out the "best" captured waveform for each data split based on the amount of off-track write obtained in step (8).
(10) Read the "best" captured waveform for first data split and store the buffer NRZ bits.
(11) Repeat step (9)-(10) for every data split.
(12) Combine the buffer NRZ bits from each data split together to form a complete set of buffer NRZ bits for the data block.
(13) Pass the new set of NRZ bits to controller for ECC decoding.
(14) Check whether the recovered data bits after ECC decoding is correct.

This test was applied to five drives that failed a reliability test due to a data block having portions written at different off-track positions. All failed data blocks were recovered using the test procedure.

Figure 14:
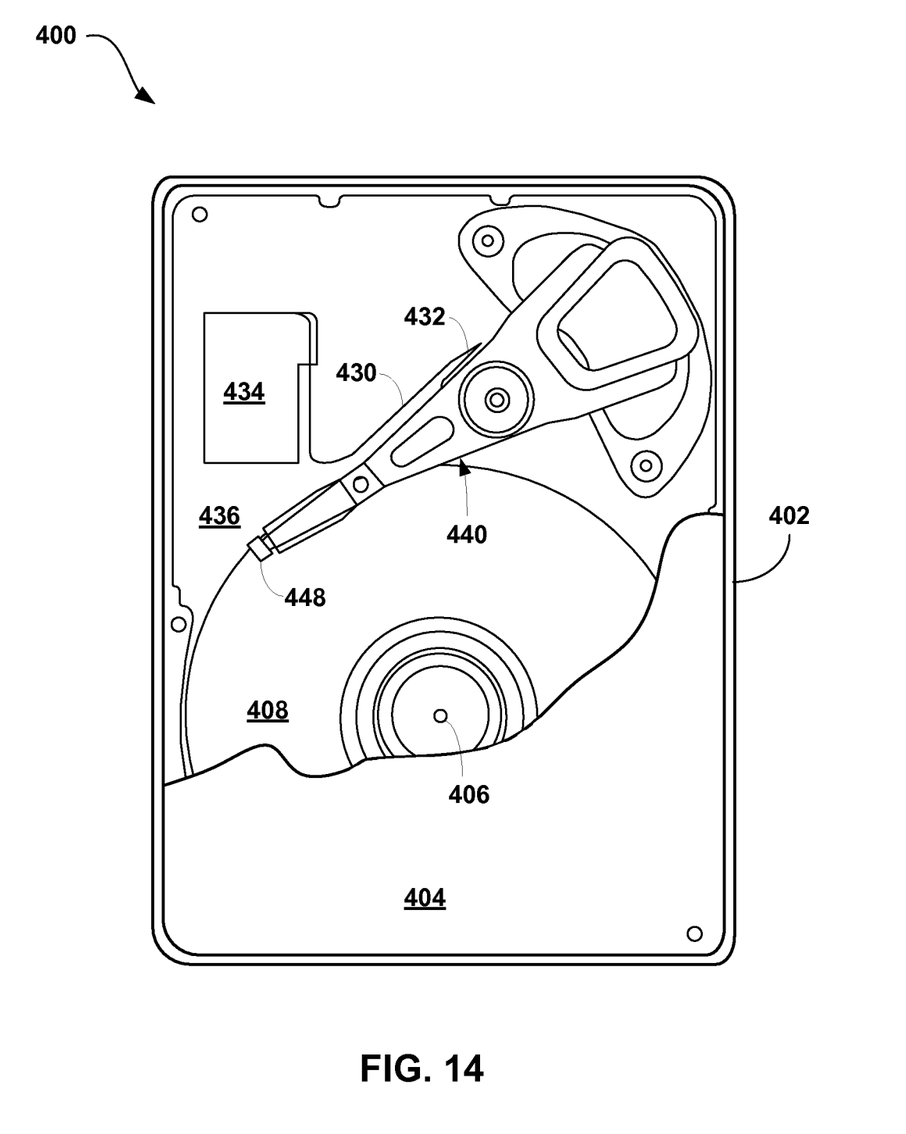
FIG. 14 illustrates an exemplary disc drive that performs partial-block off-track data recovery.

FIG. 14 is a diagram illustrating exemplary disc drive 400 that performs partial-block off-track data recovery. Cover 404, shown partially cut away, cooperates with base 402 to form a housing that defines an internal environment of disc drive 400. Disc drive 400 also includes recordable media disc 408, spindle motor 406 and actuator assembly 440 with head 448. While disc drive 400 only shows a single disc 408 and a single head 448, it may optionally include additional discs 408 and heads 448. Spindle motor 406 operates to rotate disc 408. Actuator assembly 440 pivots about bearing shaft assembly 442 moving head 448 across media tracks of disc 408. Circuit 432 controls read and write operations of head 448. Circuit 432 includes a controller such as controller 201 (FIG. 9) and memory to buffer NRZ bits for partial-block off-track data recovery. Flex assembly 430 provides electrical connection paths to control actuator assembly 440 and allows pivotal movement of actuator assembly 440 during operation. Flex assembly 430 terminates at flex bracket 434 for communication to disc drive circuit 436.

Various modifications to the disclosed embodiments may be made within the spirit of the invention. For example, the described embodiments generally involved looking at discrete portions of a data block, e.g., data splits, and determining the off-track position of each discrete portion individually. In other embodiments, portions of a data block may be defined according to the off-track position of the recorded data itself. For example, an algorithm may be used to evaluate a channel quality metrics at multiple track positions to determine where adjacent portions of data in a data block having different off-track locations are located.

The implementations described above and other implementations are within the scope of the following claims.

The invention claimed is:

1. A method comprising: determining that a recorded data block includes at least two portions written at different track positions including at least one portion written at an off-track position; performing a full-block off-track retry technique prior to determining that the data block includes at least two portions written at different off-track positions, wherein determining that the data block includes at least two portions written at different off-track positions does not require reading the data block after performing the full-block off-track retry technique; reading each portion at positions corresponding to the off-track positions of the at least two portions; combining the portions of the data block to form a recovered data block; and outputting the recovered data block to a host device.

2. The method of claim 1, wherein the recordable media includes data wedges and servo wedges, wherein the portions of the data block correspond to data splits in at least four of the data wedges.

3. The method of claim 1, wherein determining that the data block includes at least two portions written at different off-track positions comprises evaluating a channel quality metric at a plurality of track positions for each of the portions of the data block.

4. The method of claim 3, wherein the plurality of track positions comprise a set of incremental track positions.

5. The method of claim 3, wherein determining that the data block includes at least two portions written at different off-track positions further comprises determining the best track position according the channel quality metrics for each of the portions of the data block.

6. The method of claim 1, wherein determining that the data block includes at least two portions written at different off-track positions comprises determining that the best track positions of the portions of the data block are not the same for all of the portions of the data block.

7. The method of claim 1, wherein reading each portion of the data block at its position and combining the data portions to form a recovered data block comprises buffering portions of the data block located at a first track position while reading portions of the data block located at a second track position.

8. The method of claim 7, wherein the buffering comprising buffering non-return-to-zero bits at a read channel output used in reading the recordable media.

9. The method of claim 1, wherein reading each portion of the data block at its position and combining the data portions to form a recovered data block comprises:
   reading the entire data block at a first track position;
   buffering the entire data block as read at the first track position;
   reading the entire data block at a second track position; and
   selecting portions of the data block that correspond to the first track position and the second track position for the combining of the portions of the data block to form the recovered data block.

10. A device comprising: a data storage media including data recorded in one or more data blocks; and a controller configured to determine that one of the data blocks includes at least two portions written at different track positions including at least one portion written at an off-track position and also determines approximate track positions of the at least two portions of the data block; the controller further configured to perform a full-block off-track retry technique prior to determining the data block includes at least two portions written at different off-track positions, wherein determining at the data block includes at least two portions written at different off-track positions does not require reading the data block after performing the full-block off-track retry technique; wherein the controller outputs the one of the data blocks to a host device.

11. The data storage device of claim 10, further comprising a memory buffer that stores the data portions.

12. The data storage device of claim 11,
   wherein the controller combines the buffered portions to form a recovered data block,
   wherein the controller performs error correction code decoding on the recovered data block.

13. The data storage device of claim 10, wherein the controller evaluates a channel quality metric at a plurality of track positions for each of the data portions.

14. The data storage device of claim 13, wherein the controller determines the best track position according the channel quality metrics for each of the data portions.

15. The data storage device of claim 13, wherein the plurality of track positions comprise a set of incremental track positions.

16. A controller, comprising: an encoder configured to receive a data block from a host device; a formatter configured to: determine that a data block including recorded data on a data storage media includes at least two portions written at different track positions including at least one portion written at an off-track position; determine approximate track positions of the at least two portions of the data block; and issue instructions to read the at least two portions of the data block at the approximate track positions; and issue instructions to perform a full-block off-track retry technique, wherein determining that a data block including recorded data on a data storage media includes at least two portions written at different track positions including at least one portion written at an off-track position does not require reading the data block after the full-block off-track retry technique is performed; and a decoder configured to output the data block to the host device.

17. The controller of claim 16, wherein determining approximate track positions of the at least two portions of the data block includes evaluating a channel quality metric at a plurality of track positions for each of the data portions.

* * * * *